United States Patent
Kashiwagi et al.

(10) Patent No.: US 11,339,099 B2
(45) Date of Patent: May 24, 2022

(54) HONEYCOMB STRUCTURE

(71) Applicant: NGK INSULATORS, LTD., Nagoya (JP)

(72) Inventors: Nobuyuki Kashiwagi, Nagoya (JP); Yasunori Yamazaki, Nagoya (JP); Hideyuki Toyoshima, Nagoya (JP); Hirotaka Yamamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 711 days.

(21) Appl. No.: 15/906,202

(22) Filed: Feb. 27, 2018

(65) Prior Publication Data
US 2018/0257998 A1    Sep. 13, 2018

(30) Foreign Application Priority Data
Mar. 7, 2017    (JP) .............................. JP2017-042737

(51) Int. Cl.
*B01D 46/24* (2006.01)
*C04B 38/00* (2006.01)
(Continued)

(52) U.S. Cl.
CPC ...... *C04B 38/0009* (2013.01); *B01D 46/2462* (2013.01); *B01D 46/2474* (2013.01); *C04B 35/195* (2013.01); *B01D 46/249* (2021.08); *B01D 53/94* (2013.01); *B01D 2279/30* (2013.01); *B01J 35/04* (2013.01); *C04B 2111/0081* (2013.01); *C04B 2111/00793* (2013.01); *C04B 2111/2084* (2013.01);
(Continued)

(58) Field of Classification Search
None
See application file for complete search history.

(56) References Cited

U.S. PATENT DOCUMENTS

| 5,494,881 A | 2/1996 | Machida et al. |
| 2001/0033910 A1 | 10/2001 | Ikeshima |

(Continued)

FOREIGN PATENT DOCUMENTS

| DE | 601 11 411 T2 | 5/2006 |
| DE | 10 2009 001 820 A1 | 10/2009 |

(Continued)

OTHER PUBLICATIONS

Komori et al., machine translation of JP 2013-017967, Jan. 31, 2013 (Year: 2013).*

(Continued)

*Primary Examiner* — Mary I Omori
(74) *Attorney, Agent, or Firm* — Burr & Brown, PLLC (57) ABSTRACT

A honeycomb structure including: a honeycomb structure body having porous partition walls which define a plurality of cells extending from an inflow end face to an outflow end face to form through channels for a fluid, and a first circumferential wall which is disposed in at least a part of a circumference of the partition walls, and a second circumferential wall disposed to surround an outer side of the honeycomb structure body, wherein the honeycomb structure body does not have an interface between the partition walls and the first circumferential wall, and in a face perpendicular to an extending direction of the cells, a maximum thickness of the first circumferential wall is from 0.1 to 0.3 mm.

4 Claims, 5 Drawing Sheets

(51) Int. Cl.
    *C04B 35/195*     (2006.01)
    *B01J 35/04*     (2006.01)
    *B01D 53/94*     (2006.01)
    *C04B 111/20*     (2006.01)
    *C04B 111/00*     (2006.01)
    *C04B 111/34*     (2006.01)

(52) U.S. Cl.
    CPC . *C04B 2111/343* (2013.01); *C04B 2235/3217* (2013.01); *C04B 2235/3218* (2013.01); *C04B 2235/349* (2013.01); *C04B 2235/3418* (2013.01); *C04B 2235/3481* (2013.01)

(56) References Cited

U.S. PATENT DOCUMENTS

| | | |
|---|---|---|
| 2005/0186389 A1 | 8/2005 | Aoki |
| 2009/0004431 A1* | 1/2009 | Ninomiya ............. C04B 41/009 428/116 |
| 2009/0291841 A1* | 11/2009 | Ohno ................... C04B 41/5024 502/77 |
| 2010/0205921 A1* | 8/2010 | Okazaki ........... C04B 35/62665 55/523 |
| 2016/0074800 A1 | 3/2016 | Ito et al. |

FOREIGN PATENT DOCUMENTS

| | | | |
|---|---|---|---|
| EP | 3 002 429 | A1 | 4/2016 |
| JP | H07-039761 | A1 | 2/1995 |
| JP | 2001-261428 | A1 | 9/2001 |
| JP | 2005-230680 | A1 | 9/2005 |
| JP | 2010-001205 | A1 | 1/2010 |
| JP | 2013017967 | A * | 1/2013 ........... F01N 3/2828 |
| JP | 2013-056825 | A1 | 3/2013 |

OTHER PUBLICATIONS

German Office Action (Application No. 10 2018 001 791.6) dated Jul. 2, 2020 (with English translation).

Japanese Office Action (Application No. 2017-042737) dated Jul. 9, 2019 (with English translation).

* cited by examiner

HONEYCOMB STRUCTURE

The present application is an application based on JP-2017-042737 filed on Jul. 3, 2017 with the Japan Patent Office, the entire contents of which are incorporated herein by reference.

BACKGROUND OF THE INVENTION

Field of the Invention

The present invention relates to a honeycomb structure, and more particularly, it relates to a honeycomb structure excellent in shape accuracy as well as thermal shock resistance.

Description of the Related Art

In various fields of chemistry, electricity, iron and steel, and the like, honeycomb structures made of ceramics have been employed as carriers for catalyst devices for use in environmental countermeasures, recovery of specific substances, and the like. Furthermore, the honeycomb structures made of ceramics have been used as exhaust gas purifying catalyst carriers and filters. The honeycomb structures made of ceramics are excellent in heat resistance and corrosion resistance, and are employed in various use applications as described above.

Such a honeycomb structure has a pillar shape and includes partition walls which define a plurality of cells to form through channels for an exhaust gas, and a circumferential wall which is disposed to surround a circumference of the partition walls (e.g., see Patent Document 1). The honeycomb structure is manufactured by extruding a forming raw material including a ceramic raw material and the like to obtain a formed body in the form of honeycomb, and drying and firing the obtained formed body. In the honeycomb structure manufactured by such a method as described above, the partition walls and the circumferential wall are formed by extruding the material once, and hence, the partition walls and the circumferential wall form a continuous structure. Hereinafter, the honeycomb structure in which the partition walls and the circumferential wall are monolithically formed by the extrusion or the like will occasionally be referred to as "the monolithic honeycomb structure".

Furthermore, there has been suggested a technology of removing the circumferential wall of the honeycomb structure by machining such as grinding, and applying a circumference coating material including the ceramic raw material in place of the removed circumferential wall, to form a circumference coating layer (e.g., see Patent Document 2). In the honeycomb structure including the circumference coating layer, the circumferential wall is removed by the machining, and hence, the partition walls and the circumference coating layer form separate structures. Hereinafter, the honeycomb structure including the circumference coating layer will occasionally be referred to as "the circumference coating honeycomb structure".

[Patent Document 1] JP-A-H07-39761
[Patent Document 2] JP-A-2013-56825

SUMMARY OF THE INVENTION

A monolithic honeycomb structure has the advantage that, even when a thickness of a circumferential wall decreases, the honeycomb structure has an excellent thermal shock resistance, as compared with a circumference coating honeycomb structure. However, in the monolithic honeycomb structure, partition walls and the circumferential wall are monolithically formed by extrusion or the like, and hence, there is the problem that a shape accuracy of the obtained honeycomb structure easily deteriorates. Furthermore, as described above, the circumference coating honeycomb structure has the problem that its thermal shock resistance is lower than that of the monolithic honeycomb structure.

The present invention has been developed in view of the problems of such conventional technologies. The present invention is directed to a honeycomb structure excellent in shape accuracy as well as thermal shock resistance.

According to the present invention, there is provided a honeycomb structure as follows.

According to a first aspect of the present invention, a honeycomb structure including:

a honeycomb structure body having porous partition walls which define a plurality of cells extending from an inflow end face to an outflow end face to form through channels for a fluid, and a first circumferential wall which is disposed in at least a part of a circumference of the partition walls, and a second circumferential wall disposed to surround an outer side of the honeycomb structure body, wherein the honeycomb structure body does not have an interface between the partition walls and the first circumferential wall, and in a face perpendicular to an extending direction of the cells, a maximum thickness of the first circumferential wall is from 0.1 to 0.3 mm.

According to a second aspect of the present invention, the honeycomb structure according to the above first aspect is provided wherein in the face perpendicular to the extending direction of the cells, an average thickness of the second circumferential wall is from 0.8 to 1.4 mm.

According to a third aspect of the present invention, the honeycomb structure according to the above first to second aspects is provided, wherein in the face perpendicular to the extending direction of the cells, a total of a maximum thickness of the first circumferential wall and an average thickness of the second circumferential wall is from 1.0 to 1.7 mm.

According to a fourth aspect of the present invention, the honeycomb structure according to any one of the above first to third aspects is provided, wherein in the face perpendicular to the extending direction of the cells, a ratio of a maximum thickness of the first circumferential wall to an average thickness of the second circumferential wall is from 0.1 to 0.3.

According to a fifth aspect of the present invention, the honeycomb structure according to any one of the above first to fourth aspects is provided, wherein the surface of the first circumferential wall is an uneven face having unevenness, and in the face perpendicular to the extending direction of the cells, a peripheral length of the surface of the first circumferential wall is a length from 1.001 to 1.003 times as much as a peripheral length of a circle equivalent to an area of a region surrounded by the first circumferential wall.

According to a sixth aspect of the present invention, the honeycomb structure according to the above fifth aspects is provided, wherein the uneven face of the first circumferential wall has a corrugated wave shape, and a wave length of the wave shape is from 5.1 to 8.5 mm.

According to a seventh aspect of the present invention, the honeycomb structure according to the above fifth or sixth aspects is provided, wherein the uneven face of the first circumferential wall has a corrugated wave shape, and a value of a difference between a maximum thickness and a minimum thickness of the first circumferential wall is from 0.1 to 0.3 mm.

A honeycomb structure of the present invention exhibits the effect that the honeycomb structure is excellent in shape accuracy as well as thermal shock resistance. The honeycomb structure of the present invention further includes a second circumferential wall on an outer side of a honeycomb structure body constituted of partition walls and a first circumferential wall. The honeycomb structure body does not have an interface between the partition walls and the first circumferential wall. Therefore, the honeycomb structure body is a structure in which the partition walls are continuous with the first circumferential wall. Then, in the honeycomb structure of the present invention, as the first circumferential wall, a very thin first circumferential wall is employed in which a maximum thickness is from 0.1 to 0.3 mm. The first circumferential wall has the maximum thickness of 0.3 mm or less, and micro cracks are easily generated in the first circumferential wall. Furthermore, the micro cracks generated in the first circumferential wall have a buffering action against thermal expansion. In the honeycomb structure of the present invention, the above-mentioned micro cracks having the buffering action are intentionally generated in the first circumferential wall, thereby achieving improvement of the thermal shock resistance of the whole honeycomb structure. Furthermore, the second circumferential wall is disposed to cover the first circumferential wall, thereby achieving improvement of the shape accuracy of the honeycomb structure while compensating for insufficient strength of the first circumferential wall.

DESCRIPTION OF THE PREFERRED EMBODIMENTS

Hereinafter, description will be made as to embodiments of the present invention. However, the present invention is not limited to the following embodiments. Therefore, it should be understood that changes, improvements and the like are addable to the following embodiments on the basis of ordinary knowledge of a person skilled in the art without departing from the gist of the present invention.

(1) Honeycomb Structure (First Embodiment)

A first embodiment of a honeycomb structure of the present invention is such a honeycomb structure 100 as shown in FIG. 1 to FIG. 4. The honeycomb structure 100 further includes a second circumferential wall 4 on an outer side of a honeycomb structure body 5. The honeycomb structure body 5 has porous partition walls 1 and a first circumferential wall 3. The honeycomb structure body 5 does not have an interface between the partition walls 1 and the first circumferential wall 3. That is, it can be considered that the honeycomb structure body 5 is a structure in which the partition walls 1 are continuous with the first circumferential wall 3. The partition walls 1 of the honeycomb structure body 5 define a plurality of cells 2 extending from an inflow end face 11 to an outflow end face 12 to form through channels for a fluid. The first circumferential wall 3 is disposed to surround at least a part of a circumference of the partition walls 1. The second circumferential wall 4 is disposed to surround the outer side of the honeycomb structure body 5. Furthermore, in the honeycomb structure 100 of the present embodiment, a maximum thickness of the first circumferential wall 3 in a face perpendicular to an extending direction of the cells 2 is from 0.1 to 0.3 mm.

An example of the honeycomb structure body 5 is a structure in which the partition walls 1 and the first circumferential wall 3 are monolithically constituted. When "the partition walls 1 and the first circumferential wall 3 are monolithically constituted", it is meant that the partition walls 1 and the first circumferential wall 3 are formed by performing the formation once. Here, an example of the formation is extrusion. In the honeycomb structure 100 of the present embodiment, it can be considered that the honeycomb structure body 5 is a structure constituted of a sintered body in which the partition walls 1 are continuous with the first circumferential wall 3.

Figure 1:
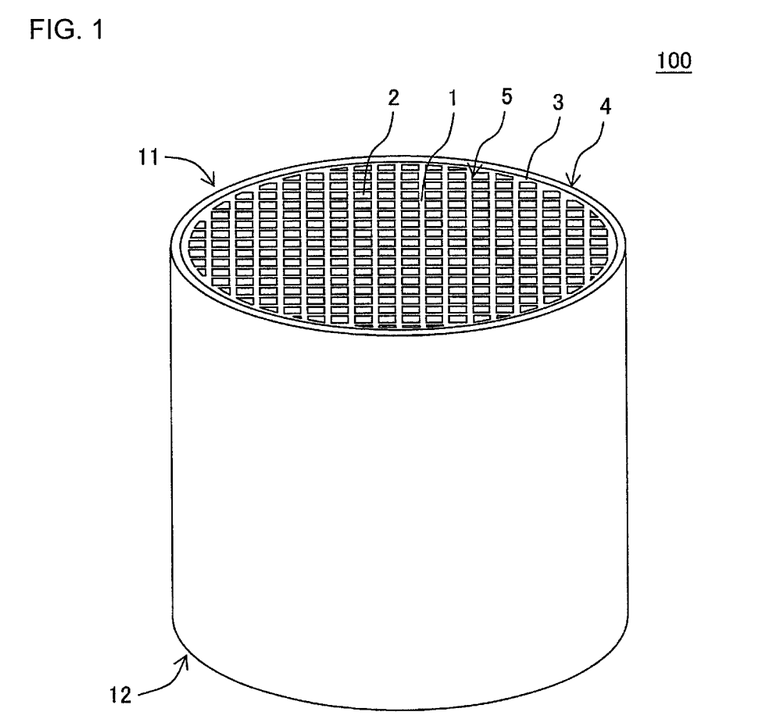
FIG. 1 is a perspective view schematically showing a first embodiment of a honeycomb structure of the present invention.
Figure 2:
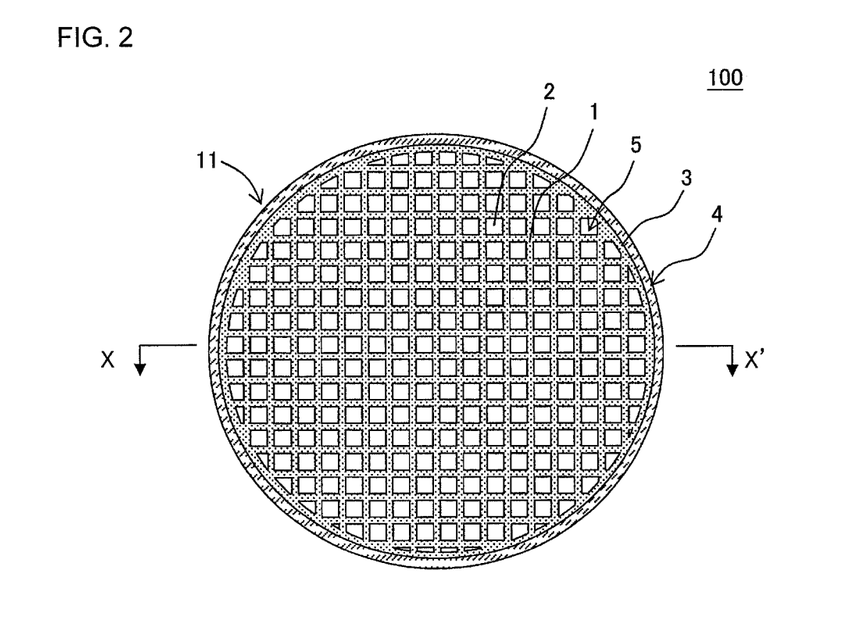
FIG. 2 is a plan view schematically showing an inflow end face of the honeycomb structure shown in FIG. 1.
Figure 3:
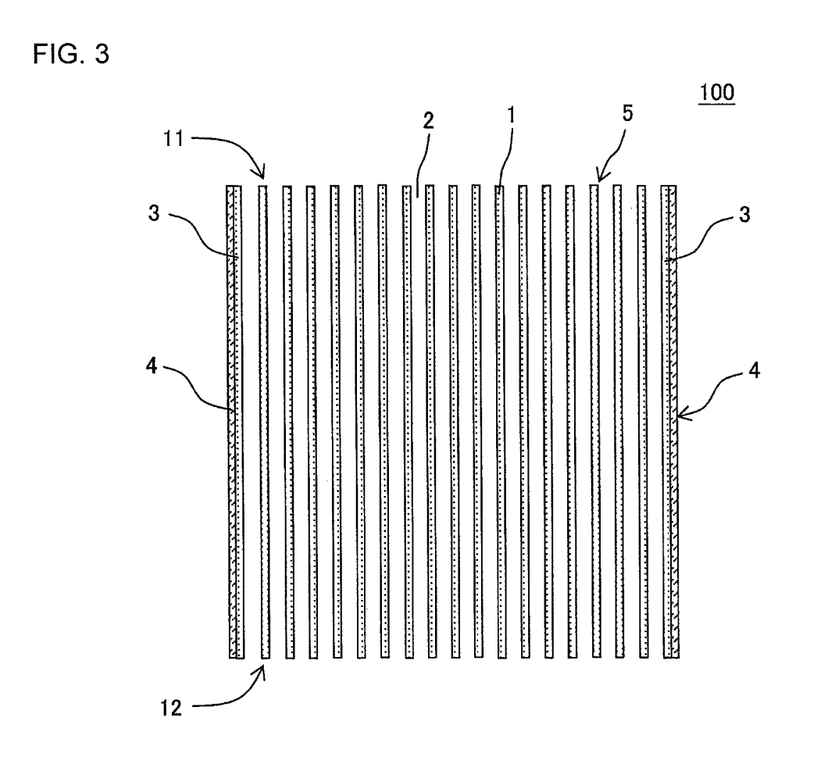
FIG. 3 is a cross-sectional view schematically showing a cross section taken along the X-X' line of FIG. 2.
Figure 4:
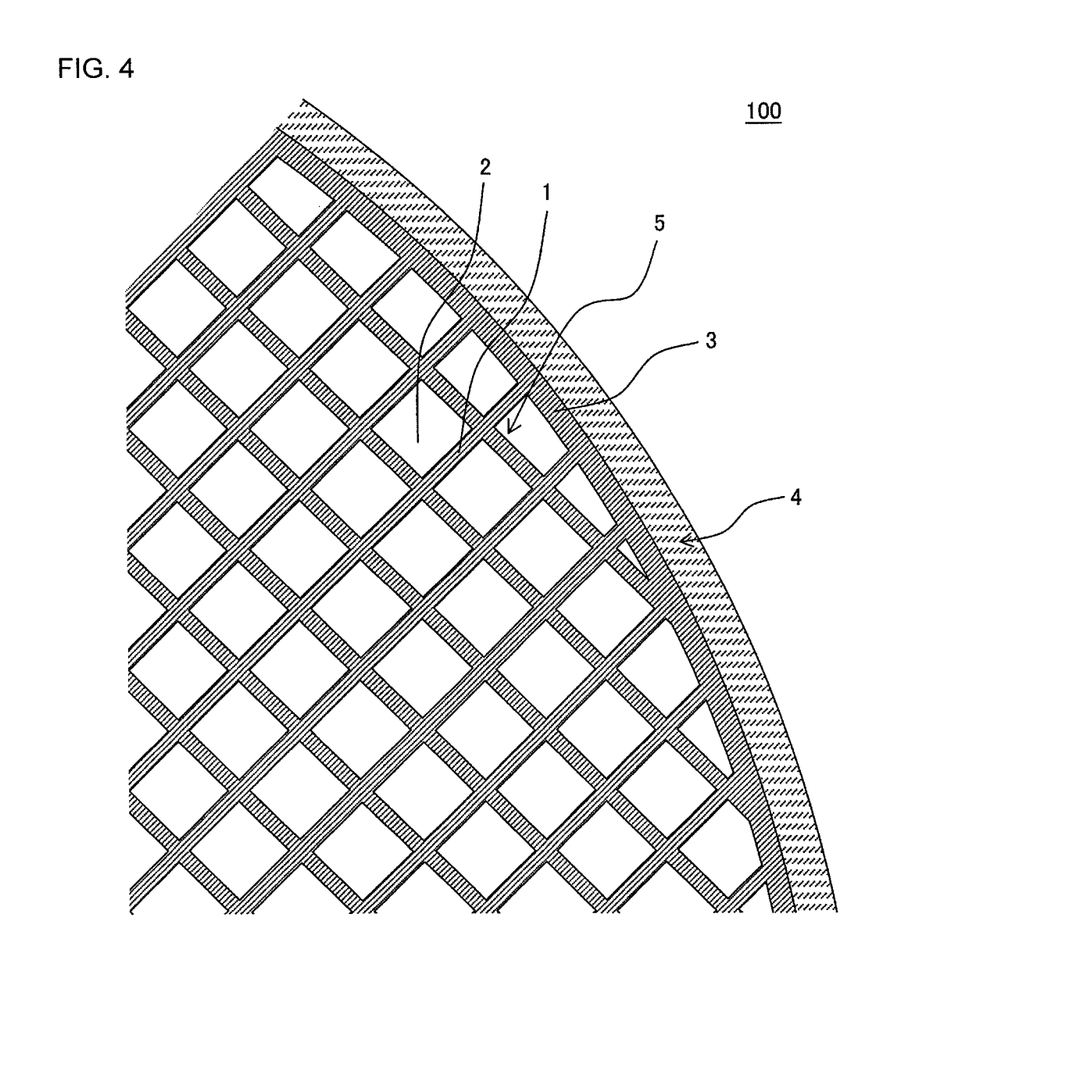
FIG. 4 is an enlarged plan view showing enlarged parts of a first circumferential wall and a second circumferential wall of the honeycomb structure shown in FIG. 2.

Here, FIG. 1 is a perspective view schematically showing the first embodiment of the honeycomb structure of the present invention. FIG. 2 is a plan view schematically showing the inflow end face of the honeycomb structure shown in FIG. 1. FIG. 3 is a cross-sectional view schematically showing a cross section taken along the X-X' line of FIG. 2. FIG. 4 is an enlarged plan view showing enlarged parts of the first circumferential wall and the second circumferential wall of the honeycomb structure shown in FIG. 2.

The honeycomb structure 100 of the present embodiment exhibits the effect that the honeycomb structure is excellent in shape accuracy as well as thermal shock resistance. That is, the honeycomb structure 100 of the present embodiment is a structure in which the partition walls 1 are continuous with the first circumferential wall 3, and the second circumferential wall 4 is further disposed on an outer side of the first circumferential wall 3. Then, in the honeycomb structure 100 of the present embodiment, as the first circumferential wall 3, the very thin first circumferential wall 3 is employed in which the maximum thickness is from 0.1 to 0.3 mm. The first circumferential wall 3 has the maximum thickness of 0.1 to 0.3 mm, and micro cracks are easily generated in the first circumferential wall 3, and the micro cracks have a buffering action against thermal expansion. Consequently, in the honeycomb structure 100 of the present embodiment, the micro cracks are easily generated in the first circumferential wall 3, thereby achieving improvement of the thermal shock resistance of the whole honeycomb structure 100 by use of the buffering action of the micro cracks. Furthermore, the second circumferential wall 4 is disposed to cover the first circumferential wall 3, thereby achieving improvement of the shape accuracy of the honeycomb structure 100 while compensating for insufficient strength of the first circumferential wall 3.

When the maximum thickness of the first circumferential wall 3 is in excess of 0.3 mm, the thickness of the first circumferential wall 3 excessively increases, the micro cracks are therefore hard to be generated in the first circumferential wall 3, and it is difficult to obtain the buffering action by the micro cracks. Furthermore, when the maximum thickness of the first circumferential wall 3 is in excess of 0.3 mm and when the second circumferential wall 4 is disposed to cover the first circumferential wall 3, a total thickness of the first circumferential wall 3 and the second circumferential wall 4 increases, and when this honeycomb structure is compared with a honeycomb structure of the same size, an effective sectional area of the cells 2 forming the through channels for the fluid decreases. When the maximum thickness of the first circumferential wall 3 is less than 0.1 mm, damages and the like of the first circumferential wall 3 are likely to occur due to strength deterioration. Furthermore, when the honeycomb structure does not have the first circumferential wall 3, the honeycomb structure body 5 is easily deformed during manufacturing, and the shape accuracy of the honeycomb structure 100 deteriorates. Hereinafter, unless otherwise specified, "the thickness of the first circumferential wall" means "the thickness of the first circumferential wall" in the face perpendicular to the extending direction of the cells. Furthermore, "a thickness of the second circumferential wall" and "a thickness of the partition walls" also mean "the thickness of the second circumferential wall" and "the thickness of the partition walls" in the face perpendicular to the extending direction of the cells.

It is preferable that the maximum thickness of the first circumferential wall 3 is from 0.1 to 0.2 mm. According to such a constitution, the buffering action by the micro cracks generated in the first circumferential wall 3 is more suitably obtainable while inhibiting the damages of the first circumferential wall 3.

The surface of the first circumferential wall 3 may be subjected to machining such as grinding. That is, the partition walls 1 and the first circumferential wall 3 constitute a monolithic structure formed by performing the extrusion once, but in its manufacturing stage, for example, during the extrusion, its maximum thickness may be in excess of 0.3 mm. For example, the surface of the first circumferential wall 3 having the maximum thickness in excess of 0.3 mm may be subjected to known machining such as grinding so that the maximum thickness of the first circumferential wall 3 is 0.3 mm or less, before the second circumferential wall 4 is disposed.

The maximum thickness of the first circumferential wall 3 is a maximum value among measured thicknesses of 24 points which are obtained by measuring the thickness of the first circumferential wall 3 at eight points in each of three cross sections mentioned below in the honeycomb structure 100 of a measurement object. The cross sections in which the thicknesses of the first circumferential wall 3 are measured are three cross sections including a cross section of the honeycomb structure 100 on the side of the inflow end face 11, a cross section of the honeycomb structure 100 on the side of the outflow end face 12, and a central cross section of the honeycomb structure 100 in the extending direction of the cells 2. The cross section of the honeycomb structure 100 on the side of the inflow end face 11 is an optional cross section within 5% of a length from the inflow end face 11 of the honeycomb structure 100 in the extending direction of the cells 2. The cross section of the honeycomb structure 100 on the side of the outflow end face 12 is an optional cross section within 5% of a length from the outflow end face 12 of the honeycomb structure 100 in the extending direction of the cells 2. The central cross section of the honeycomb structure 100 in the extending direction of the cells 2 is an optional cross section within ±5% of a length from the center of the honeycomb structure 100 in the extending direction of the cells 2. As to measurement points in each cross section, one measurement point is initially determined in each cross section. Then, there are determined seven measurement points moved in a clockwise direction every 45° from the above measurement point. Eight measurement points obtained by adding the initially determined measurement point to the seven measurement points moved every 45° are determined as the measurement points in each cross section.

Then, each measurement point is observed with a scanning electron microscope or a microscope to measure the thickness of the first circumferential wall 3, after the measurement points are determined as described above. The thickness of the first circumferential wall 3 is a thickness in a normal direction to the surface of the first circumferential wall 3. Furthermore, when the thickness of the first circumferential wall 3 is measured, intersecting portions of the first circumferential wall 3 and the partition walls 1 are observed, and presence/absence of a boundary between the first circumferential wall 3 and the partition walls 1 can be confirmed. When there is not the boundary between the first circumferential wall 3 and the partition walls 1, it can be judged that there is not the interface between the first circumferential wall 3 and the partition walls 1. For example, when the first circumferential wall 3 and the partition walls 1 form a structure constituted of the sintered body, it can be considered that the first circumferential wall 3 is constituted monolithically with the partition walls 1. It is to be noted that the presence/absence of the boundary can be confirmed in accordance with a difference in color tone between the first circumferential wall 3 and the partition walls 1 in an image. For example, when a composition of the first circumferential wall 3 is different from that of the partition walls 1, the color tone of the first circumferential wall 3 is different from that of the partition walls 1. Furthermore, except for the above-mentioned color tone, the presence/absence of the boundary can be judged, for example, in accordance with particle diameters of particles constituting the first circumferential wall 3 and the partition walls 1, respectively, or a difference in density, e.g., a difference in porosity or the like.

A boundary between the first circumferential wall 3 and the second circumferential wall 4 can be confirmed in an enlarged image with the scanning electron microscope or the microscope. For example, in the above-mentioned image, the boundary can be judged in accordance with a difference in color tone between the first circumferential wall 3 and the second circumferential wall 4. Furthermore, except for the above-mentioned color tone, the boundary can be judged, for example, in accordance with particle diameters of particles constituting the first circumferential wall 3 and the second circumferential wall 4, respectively, or a difference in density, e.g., a difference in porosity or the like.

According to the honeycomb structure 100, in the face perpendicular to the extending direction of the cells 2, an average thickness of the second circumferential wall 4 is preferably from 0.8 to 1.4 mm and further preferably from 0.8 to 1.0 mm. When the average thickness of the second circumferential wall 4 is less than 0.8 mm, the first circumferential wall 3 might unfavorably be exposed. On the other hand, when the average thickness of the second circumferential wall 4 is in excess of 1.4 mm, the thermal shock resistance might deteriorate.

In the present description, the average thickness of the second circumferential wall 4 is an average value of measured thicknesses of 24 points in total which are obtained by measuring the thickness of the second circumferential wall 4 at eight points in each of three cross sections of the honeycomb structure 100 of the measurement object. A method of measuring the thickness of the second circumferential wall 4 conforms to the hitherto described method of measuring the thickness of the first circumferential wall 3.

In the face perpendicular to the extending direction of the cells 2, a total of the maximum thickness of the first circumferential wall 3 and the average thickness of the second circumferential wall 4 is preferably from 1.0 to 1.7 mm and further preferably from 1.0 to 1.2 mm. When the above-mentioned total thickness is less than 1.0 mm, strength of the honeycomb structure 100 might deteriorate. On the other hand, when the above-mentioned total thickness is in excess of 1.7 mm, the thermal shock resistance might deteriorate.

In the face perpendicular to the extending direction of the cells 2, a ratio of the maximum thickness of the first circumferential wall 3 to the average thickness of the second circumferential wall 4 is preferably from 0.1 to 0.3 and further preferably from 0.1 to 0.25. When the above-mentioned ratio is less than 0.1, the strength of the honeycomb structure 100 might deteriorate. On the other hand, when the above-mentioned ratio is in excess of 0.3, the thermal shock resistance might deteriorate.

There are not any special restrictions on a shape of the cells 2 in the face perpendicular to the extending direction of the cells 2. Examples of the shape of the cells 2 include a triangular shape, a quadrangular shape, a hexagonal shape, an octagonal shape, a round shape, and any combination of these shapes.

It is preferable that a thickness of the partition walls 1 is from 50 to 500 µm. When the thickness of the partition walls 1 is smaller than 50 µm, the strength of the honeycomb structure 100 might deteriorate. When the thickness of the partition walls 1 is larger than 500 µm, a purification performance might deteriorate, or pressure loss in passing a gas through the honeycomb structure 100 might increase.

It is preferable that a porosity of the partition walls 1 is from 20 to 70%. When the porosity of the partition walls 1 is less than 20%, the pressure loss of the honeycomb structure 100 might increase. For example, when the honeycomb structure is used as a PM trapping filter to be disposed in an exhaust system of an engine, output drop of the engine might be caused. Furthermore, when the porosity of the partition walls 1 is in excess of 70%, a sufficient strength might not be obtained. The porosity of the partition walls 1 is a value measured with a mercury porosimeter. An example of the mercury porosimeter is AutoPore 9500 (tradename) manufactured by Micromeritics Instrument Corp.

It is preferable that a cell density of the honeycomb structure 100 is, for example, from 15 to 200 cells/cm$^2$. When the cell density is less than 15 cells/cm$^2$ and when the honeycomb structure 100 is used as an exhaust gas purifying member, an area to perform an exhaust gas purifying treatment decreases, and a sufficient purification performance might not be exerted. On the other hand, when the cell density is in excess of 200 cells/cm$^2$, the pressure loss in passing the gas through the honeycomb structure 100 might increase.

An example of an overall shape of the honeycomb structure 100 is a pillar shape in which an end face has a round shape, an oval shape or the like. As to a size of the honeycomb structure 100 having the round pillar shape, for example, a diameter of its bottom surface is preferably from 50 to 450 mm. Furthermore, a length of the honeycomb structure 100 in a central axis direction is preferably from 10 to 450 mm.

There are not any special restrictions on a material of the partition walls 1 and the first circumferential wall 3. An example of the material of the partition walls 1 and the first circumferential wall 3 is a material containing ceramic as a main component. A suitable example of ceramic is a material containing at least one selected from the group consisting of cordierite, silicon carbide, a silicon-silicon carbide based composite material, mullite, alumina, aluminum titanate, silicon nitride, a cordierite forming raw material, lithium aluminum silicate, and a silicon carbide-cordierite based composite material. When the material "contains ceramic as the main component", it is meant that ceramic is contained as much as 50 mass % or more in the whole material.

There are not any special restrictions on a material of the second circumferential wall 4. An example of the material of the second circumferential wall 4 is a material containing ceramic as a main component. An example of the material of the second circumferential wall 4 is similar to the suitable example of the material of the partition walls 1 and the first circumferential wall 3. It is more preferable that the second circumferential wall 4 is a circumference coating layer formed by coating the surface of the first circumferential wall 3 with a circumference coating material including such a material as described above.

(2) Honeycomb Structure (Second Embodiment)

Figure 5:
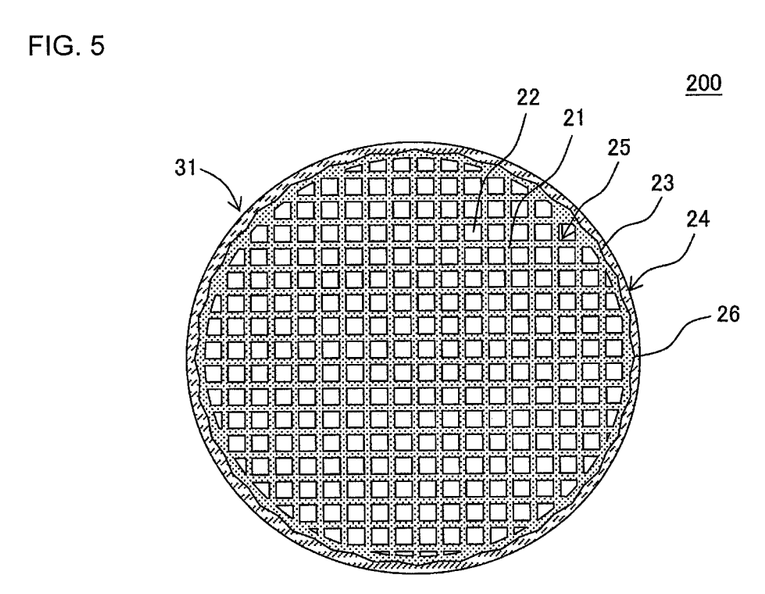
FIG. 5 is a plan view schematically showing an inflow end face of a second embodiment of the honeycomb structure of the present invention.
Figure 6:
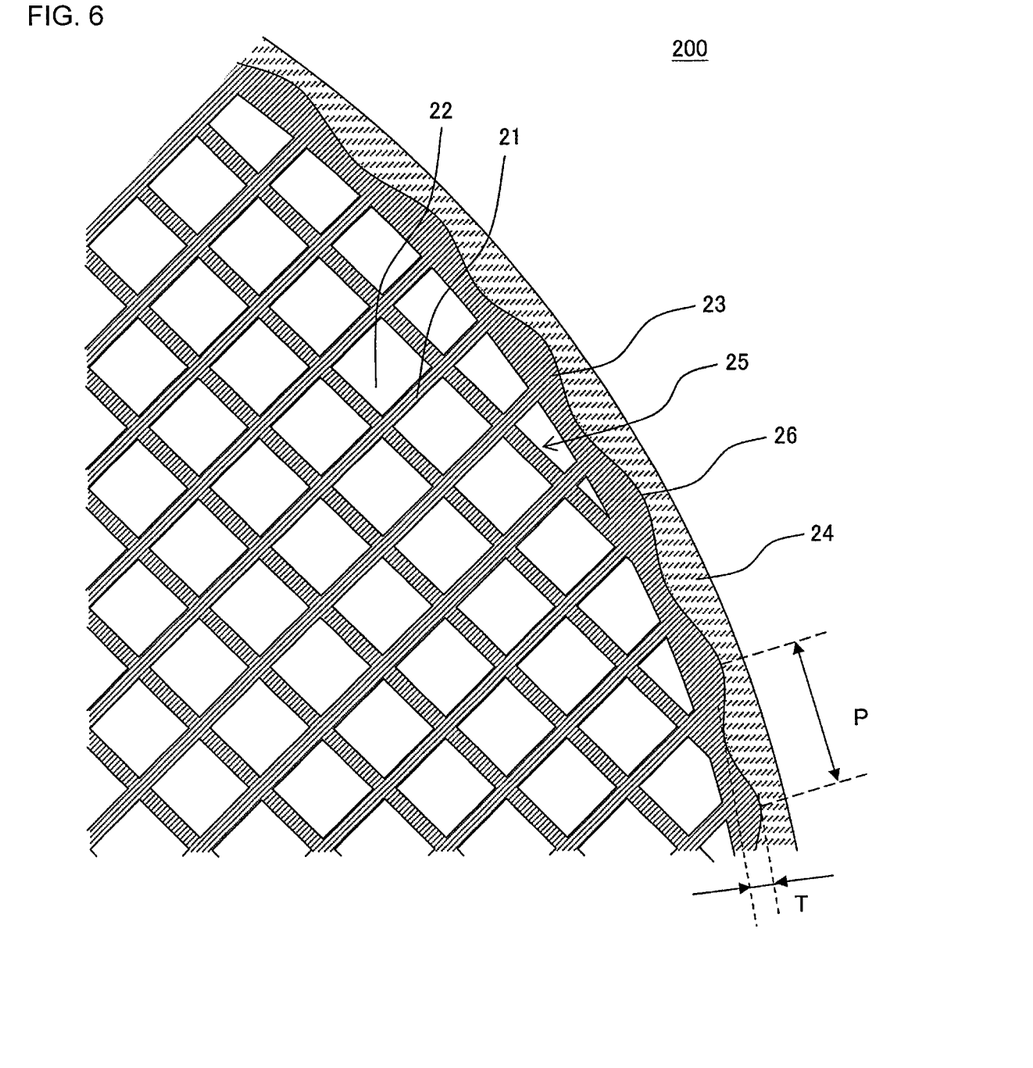
FIG. 6 is an enlarged plan view showing enlarged parts of a first circumferential wall and a second circumferential wall of the honeycomb structure shown in FIG. 5.

Next, description will be made as to a second embodiment of the honeycomb structure of the present invention. It is preferable that the honeycomb structure of the second embodiment is constituted similarly to the hitherto described honeycomb structure of the first embodiment, except that a shape of the surface of a first circumferential wall is an uneven face having unevenness. Here, FIG. 5 is a plan view schematically showing an inflow end face of the second embodiment of the honeycomb structure of the present invention. FIG. 6 is an enlarged plan view showing enlarged parts of the first circumferential wall and a second circumferential wall of the honeycomb structure shown in FIG. 5.

As shown in FIG. 5 and FIG. 6, a honeycomb structure 200 of the present embodiment includes a honeycomb structure body 25 and a second circumferential wall 24. The honeycomb structure body 25 has porous partition walls 21, and a first circumferential wall 23 disposed in at least a part of a circumference of the partition walls 21. The partition walls 21 of the honeycomb structure body 25 define a plurality of cells 22 extending from an inflow end face 31 to an outflow end face (not shown) to form through channels for a fluid.

The honeycomb structure body 25 does not have an interface between the partition walls 21 and the first circumferential wall 23. That is, the honeycomb structure body 25 of the honeycomb structure 200 is a structure constituted of a sintered body in which the partition walls 21 are continuous with the first circumferential wall 23. A maximum thickness of the first circumferential wall 23 in a face perpendicular to an extending direction of the cells 22 is from 0.1 to 0.3 mm.

Furthermore, in the honeycomb structure 200 of the present embodiment, the surface of the first circumferential wall 23 is the uneven face having unevenness 26. According to such a constitution, micro cracks are easily generated in the first circumferential wall 23. The unevenness 26 of the surface of the first circumferential wall 23 may be formed in a part of the surface of the first circumferential wall 23 or formed over the whole region of the surface of the first circumferential wall 23.

An example of a method of forming the unevenness 26 in the surface of the first circumferential wall 23 is a method of forming unevenness in the surface of a honeycomb formed body during extrusion of the honeycomb formed body that is a precursor of the honeycomb structure body 25. For example, conditions of a forming member for use during the extrusion and the like are suitably set, so that the honeycomb formed body having a circumferential surface in which the unevenness is formed can be prepared.

When the surface of the first circumferential wall 23 is the uneven face, in the face perpendicular to the extending direction of the cells 22, a peripheral length of the surface of the first circumferential wall 23 is larger than a peripheral length of a circle equivalent to an area of a region surrounded by the first circumferential wall 23. In the honeycomb structure 200 of the present embodiment, the peripheral length of the surface of the first circumferential wall 23 is preferably a length from 1.001 to 1.003 times and further preferably a length from 1.001 to 1.002 times as much as the peripheral length of the circle equivalent to the area of the region surrounded by the first circumferential wall 23.

The peripheral length of the surface of the first circumferential wall 23 is an average value of three measured peripheral lengths obtained by measuring the peripheral length of the surface of the first circumferential wall 23 in each of three cross sections of the honeycomb structure 200 of a measurement object. The three cross sections in which the peripheral lengths of the surface of the first circumferential wall 23 are measured are three cross sections including a cross section of the honeycomb structure 200 on the side of the inflow end face 31, a cross section of the honeycomb structure 200 on the side of the outflow end face (not shown), and a central cross section of the honeycomb structure 200 in the extending direction of the cells 22. It is preferable that the three cross sections to measure the peripheral length are the same as three cross sections to measure a thickness of the first circumferential wall 23. The peripheral length of the surface of the first circumferential wall 23 in each cross section is measurable by using a measuring instrument having predetermined graduations. During the measurement, it is preferable to perform the measurement in an enlarged image by use of a microscope. A magnification during the measurement is, for example, about 50 times. The peripheral length of the surface of the first circumferential wall 23 can be calculated as a theoretical value by use of values of "a wave length P", "a thickness of the thickest portion of the first circumferential wall 23" and "a thickness of the thinnest portion of the first circumferential wall 23" which will be described later.

The uneven face of the surface of the first circumferential wall 23 has a corrugated wave shape and the wave length P of the wave shape is preferably from 5.1 to 8.5 mm and further preferably from 5.1 to 6.4 mm. The wave length P of the wave shape is a distance from a top to a top of the wave shape in the uneven face. The wave length P of the wave shape is obtainable by measuring the distance from the top to the top of the wave shape in the measurement of the enlarged image by use of the microscope used in obtaining the peripheral length of the surface of the first circumferential wall 23.

The uneven face of the surface of the first circumferential wall 23 has the corrugated wave shape, and a value T of a difference between a maximum thickness $A_{max}$ and a minimum thickness $A_{min}$ of the first circumferential wall 23 is preferably from 0.1 to 0.3 mm and further preferably from 0.1 to 0.2 mm. "The maximum thickness $A_{max}$" is a thickness of the thickest portion of the first circumferential wall 23 in the wave shape of the surface of the first circumferential wall 23. "The minimum thickness $A_{min}$" is a thickness of the thinnest portion of the first circumferential wall 23 in the wave shape of the surface of the first circumferential wall 23.

(3) Manufacturing Method of Honeycomb Structure

Next, description will be made as to a method of manufacturing the honeycomb structure of the present invention.

Initially, a kneaded material having plasticity to prepare the partition walls and the first circumferential wall is prepared. The kneaded material to prepare the partition walls and the first circumferential wall can be prepared by suitably adding an additive such as a binder and water to a material selected as raw material powder from the above-mentioned suitable material group of the partition walls. Examples of the above-mentioned additive include an organic binder, a dispersing agent, and a surfactant. Examples of the organic binder include hydroxypropyl methylcellulose, methylcellulose, hydroxypropoxyl cellulose, hydroxyethylcellulose, carboxymethylcellulose, and polyvinyl alcohol. An example of the dispersing agent is ethylene glycol. Examples of the surfactant include ethylene glycol, dextrin, fatty acid soap, and polyalcohol.

Next, the prepared kneaded material is extruded to obtain a pillar-shaped honeycomb formed body having partition walls which define a plurality of cells and a first circumferential wall which is disposed to surround the partition walls. In the extrusion, an extruding die is usable in which slits having an inverted shape of the honeycomb formed body to be formed are formed in a kneaded material extruding surface. The maximum thickness of the first circumferential wall during the formation may be 0.3 mm or less or in excess of 0.3 mm. When the maximum thickness of the first circumferential wall is in excess of 0.3 mm, it is preferable to suitably adjust the maximum thickness to a range of 0.1 to 0.3 mm by known machining or the like prior to a step of forming an after-mentioned second circumferential wall.

The obtained honeycomb formed body may be dried, for example, with microwaves and hot air. Furthermore, open ends of the cells may be plugged with a material similar to the material used in the preparation of the honeycomb formed body, to dispose plugging portions.

Next, the obtained honeycomb formed body is fired, thereby obtaining the honeycomb structure body including the partition walls and the first circumferential wall. The honeycomb structure body is the honeycomb structure before the second circumferential wall is disposed. Firing temperature and firing atmosphere vary in accordance with the material used in the preparation of the honeycomb formed body, and the person skilled in the art can select the firing temperature and firing atmosphere which are most suitable for the selected material. Here, when the maximum thickness of the first circumferential wall of the obtained honeycomb structure body is in excess of 0.3 mm, it is preferable that the surface of the first circumferential wall is suitably ground by the known machining or the like, to adjust its maximum thickness to the range of 0.1 to 0.3 mm.

Next, the circumference coating material to form the second circumferential wall is prepared. The circumference coating material can be prepared by suitably adding an additive such as the binder, and water to a material selected as the raw material powder from the above-mentioned suitable material group of the second circumferential wall.

Next, the obtained circumference coating material is coated on the surface of the honeycomb structure body. The coated circumference coating material is dried, and the second circumferential wall is formed on the surface of the first circumferential wall of the honeycomb structure body. When necessary, the honeycomb structure body coated with the circumference coating material may be fired after the circumference coating material is dried. As described above, the honeycomb structure of the present invention can be manufactured. The method of manufacturing the honeycomb structure of the present invention is not limited to the hitherto described method.

EXAMPLES

Example 1

To 100 parts by mass of cordierite forming raw material, 35 parts by mass of dispersing medium, 6 parts by mass of organic binder and 0.5 parts by mass of dispersing agent were added, mixed and kneaded to prepare a kneaded material for extrusion. As the cordierite forming raw material, alumina, aluminum hydroxide, kaolin, talc and silica were used. Water was used as the dispersing medium, cokes having an average particle diameter of 1 to 10 μm were used as a pore former, hydroxypropyl methylcellulose was used as the organic binder, and ethylene glycol was used as the dispersing agent.

Next, the kneaded material was extruded by using a honeycomb formed body preparing die, and a honeycomb formed body was obtained so that its overall shape was a round pillar shape.

Then, the honeycomb formed body was dried with a microwave drier, and further completely dried with a hot air drier. Afterward, both end faces of the honeycomb formed body were cut to adjust a dimension of the honeycomb formed body to a predetermined dimension.

Next, the dried honeycomb formed body was degreased and fired, thereby obtaining a honeycomb structure body including partition walls and a first circumferential wall. The obtained honeycomb structure body had a round pillar shape in which a diameter of each end face was 190 mm, and a length in a cell extending direction was 200 mm. A thickness of the partition walls was 110 μm. A maximum thickness of the first circumferential wall was 0.1 mm. A cell density was 60 cells/cm².

Next, a circumference coating material was coated on the surface of the first circumferential wall of the honeycomb structure body, and the coated circumference coating material was dried to prepare a second circumferential wall. The circumference coating material was prepared by mixing cordierite particles, colloidal silica, water and a dispersing agent.

As described above, there was manufactured the honeycomb structure of Example 1 including the honeycomb structure body having the partition walls and the first circumferential wall, and the second circumferential wall disposed to surround an outer side of the first circumferential wall of the honeycomb structure body. An average thickness of the second circumferential wall was 1.0 mm. Table 1 shows a maximum thickness and a minimum thickness of the first circumferential wall in columns of "a maximum thickness $A_{max}$ (mm) of the first circumferential wall" and "a minimum thickness $A_{min}$ (mm) of the first circumferential wall". Table 1 shows the average thickness of the second circumferential wall in a column of "an average thickness B (mm) of the second circumferential wall". Hereinafter, the maximum thickness of the first circumferential wall will be referred to as "the maximum thickness $A_{max}$" or simply as "the thickness $A_{max}$", and the average thickness of the second circumferential wall will be referred to as "the average thickness B" or simply as "the thickness B". Table 1 shows a total value (mm) of the maximum thickness $A_{max}$ of the first circumferential wall and the average thickness B of the second circumferential wall in a column of "the thickness $A_{max}$+the thickness B (mm)". Table 1 shows a ratio of the maximum thickness $A_{max}$ of the first circumferential wall to the average thickness B of the second circumferential wall in a column of "the thickness $A_{max}$/the thickness B". Furthermore, Table 1 shows a value of a difference between the maximum thickness $A_{max}$ and the minimum thickness $A_{min}$ (mm) of the first circumferential wall in a column of "the value of the difference in thickness of the first circumferential wall".

The maximum thickness $A_{max}$ and the minimum thickness $A_{min}$ of the first circumferential wall were obtained from a maximum value and a minimum value among the measured thicknesses of 24 points which were obtained by measuring the thickness of the first circumferential wall at eight points in each of three cross sections mentioned below in the honeycomb structure of a measurement object. The cross sections in which the thicknesses of the first circumferential wall were measured were three cross sections including a cross section of the honeycomb structure on the side of an inflow end face, a cross section of the honeycomb structure on the side of an outflow end face, and a central cross section of the honeycomb structure in a cell extending direction. The cross section of the honeycomb structure on the side of the inflow end face was an optional cross section within 5% of a length from the inflow end face of the honeycomb structure in the cell extending direction. The cross section of the honeycomb structure on the side of the outflow end face was an optional cross section within 5% of a length from the outflow end face of the honeycomb structure in the cell extending direction. The central cross section of the honeycomb structure in the cell extending direction was an optional cross section within ±5% of a length from the center of the honeycomb structure in the cell extending direction.

The average thickness B of the second circumferential wall was an average value of measured thicknesses at 24 points in total which were obtained by measuring the thickness of the second circumferential wall at eight points in each of the above-mentioned three cross sections of the honeycomb structure of the measurement object.

As to the honeycomb structure of Example 1, the surface of the first circumferential wall was observed by the following method, and presence/absence of unevenness of the surface of the first circumferential wall was confirmed. Furthermore, when the unevenness was confirmed in the surface of the first circumferential wall, "a wave length P" of a wave shape due to this unevenness was measured. Table 1 shows the result.

"A peripheral length P' of one wave shape" of the surface of the first circumferential wall of the honeycomb structure of Example 1 was measured. "The wave length P" and "the peripheral length P' of the one wave shape" were measured by measuring a dimension of an image enlarged with a microscope, by use of a measuring instrument having predetermined graduations. In "the peripheral length P' of the one wave shape", a wave shape from one top to another adjacent top was defined as "one wave shape", and the peripheral length was a length of a straight line connecting two regions of the thickest portion of the first circumferential wall to one region of the thinnest portion that was present between the two regions. Furthermore, an area of a region surrounded by the first circumferential wall was obtained, and a peripheral length of a circle equivalent to the obtained area was calculated. The peripheral length of the surface of the first circumferential wall was 1.001 times as much as the above-mentioned "peripheral length of the equivalent circle". Table 1 shows a magnification of "the peripheral length of the surface of the first circumferential wall" to the above-mentioned "peripheral length of the equivalent circle" in a column of "the magnification of the peripheral length".

cracks were confirmed, the temperature in the firing furnace in which the honeycomb structure was heated was defined as a crack generation temperature. When any cracks were not confirmed, the honeycomb structure was further heated on conditions on which the temperature in the firing furnace was raised, and the presence/absence of the cracks was confirmed again by a method similar to the above-mentioned method. In the evaluation of the thermal shock resistance, the evaluation was carried out in accordance with the following evaluation criteria on the basis of the measured crack generation temperature. When the crack generation temperature was 650° C. or more, the result was evaluation "A". When the crack generation temperature was 600° C. or more and less than 650° C., the result was evaluation "B".

TABLE 1

| | Maximum thickness $A_{max}$ of first circumferential wall (mm) | Minimum thickness $A_{min}$ of first circumferential wall (mm) | Average thickness B of second circumferential wall (mm) | Thickness $A_{max}$ + thickness B (mm) | Thickness $A_{max}$/thickness B | Unevenness of surface of first circumferential wall | | | | |
|---|---|---|---|---|---|---|---|---|---|---|
| | | | | | | Presence/absence of unevenness | Magnification of peripheral length | Wave length (mm) | Peripheral length P' of one wave shape (mm) | Value of difference in thickness of first circumferential wall (mm) |
| Example 1 | 0.1 | 0 | 1.0 | 1.1 | 0.10 | Present | 1.001 | 5.1 | 5.1 | 0.1 |
| Example 2 | 0.2 | 0 | 0.8 | 1.0 | 0.25 | Present | 1.002 | 6.4 | 6.4 | 0.2 |
| Example 3 | 0.2 | 0 | 1.0 | 1.2 | 0.20 | Present | 1.002 | 6.4 | 6.4 | 0.2 |
| Example 4 | 0.2 | 0 | 1.2 | 1.4 | 0.17 | Present | 1.002 | 6.4 | 6.4 | 0.2 |
| Example 5 | 0.2 | 0 | 1.4 | 1.6 | 0.14 | Present | 1.002 | 6.4 | 6.4 | 0.2 |
| Example 6 | 0.3 | 0 | 1.0 | 1.3 | 0.30 | Present | 1.003 | 8.5 | 8.5 | 0.3 |
| Example 7 | 0.3 | 0 | 1.2 | 1.5 | 0.25 | Present | 1.003 | 8.5 | 8.5 | 0.3 |
| Example 8 | 0.3 | 0 | 1.4 | 1.7 | 0.21 | Present | 1.003 | 8.5 | 8.5 | 0.3 |
| Example 9 | 0.2 | 0 | 0.5 | 0.7 | 0.40 | Present | 1.002 | 6.4 | 6.4 | 0.2 |
| Example 10 | 0.1 | 0 | 2.0 | 2.1 | 0.05 | Present | 1.001 | 5.1 | 5.1 | 0.1 |
| Comparative Example 1 | 0 | 0 | 1.0 | 1.0 | 0.00 | Present | 1.000 | 0.3 | 0.3 | 0.0 |
| Comparative Example 2 | 0 | 0 | 1.5 | 1.5 | 0.00 | Present | 1.000 | 0.3 | 0.3 | 0.0 |
| Comparative Example 3 | 0.4 | 0.1 | 1.0 | 1.4 | 0.40 | Present | 1.001 | 12.7 | 12.7 | 0.3 |
| Comparative Example 4 | 0.6 | 0.3 | 1.0 | 1.6 | 0.60 | Present | 1.000 | 50.8 | 50.8 | 0.3 |
| Comparative Example 5 | 0.3 | 0 | None | — | — | Present | 1.003 | 8.5 | 8.5 | 0.3 |
| Comparative Example 6 | 0.6 | 0.3 | None | — | — | Present | 1.000 | 50.8 | 50.8 | 0.3 |
| Comparative Example 7 | 1.1 | 1.1 | None | — | — | None | 1.000 | 0.0 | 0.0 | 0.0 |
| Comparative Example 8 | 1.5 | 1.5 | None | — | — | None | 1.000 | 0.0 | 0.0 | 0.0 |

As to the honeycomb structure of Example 1, "thermal shock resistance" and "shape accuracy" were evaluated by the following methods. Furthermore, the surface of the first circumferential wall was observed with the microscope, and it was confirmed whether or not micro cracks were generated in the surface of the first circumferential wall. Table 2 shows the result.

(Thermal Shock Resistance)

Initially, the honeycomb structure of an evaluation object was thrown into a firing furnace, and a temperature in the firing furnace was gradually raised. When the honeycomb structure reached a prescribed temperature, the honeycomb structure was removed from the firing furnace, and cooled down to ambient temperature. Afterward, it was confirmed whether or not cracks were present in the second circumferential wall and the honeycomb structure body. When the When the crack generation temperature was 550° C. or more and less than 600° C., the result was evaluation "C". When the crack generation temperature was 500° C. or more and less than 550° C., the result was evaluation "D". When the crack generation temperature was less than 500° C., the result was evaluation "E". In the evaluation of the thermal shock resistance, "A", "B", "C" and "D" were regarded as pass.

(Shape Accuracy (Roundness))

In the evaluation of the shape accuracy, roundness of the round pillar-shaped honeycomb structure was measured, and evaluation was carried out on the basis of the following evaluation criteria. It is to be noted that the roundness indicates a size of a difference from a round geometric circle. In the present embodiment, a maximum diameter and a minimum diameter in an end face of the honeycomb structure were measured with a pair of Vernier calipers, and a difference between the diameters was obtained, thereby calculating the roundness (mm). Then, a measured roundness of 3.2 mm or less was evaluated as "excellent", a measured roundness which was in excess of 3.2 mm and was 5.0 mm or less was evaluated as "good", and a measured roundness in excess of 5.0 mm was evaluated as "failure".

TABLE 2

|  | Thermal shock resistance | Shape accuracy (roundness) | Presence/absence of micro cracks |
|---|---|---|---|
| Example 1 | A | Excellent | Present |
| Example 2 | A | Excellent | Present |
| Example 3 | A | Excellent | Present |
| Example 4 | B | Excellent | Present |
| Example 5 | B | Excellent | Present |
| Example 6 | B | Excellent | Present |
| Example 7 | C | Excellent | Present |
| Example 8 | C | Excellent | Present |
| Example 9 | C | Good | Present |
| Example 10 | D | Excellent | Present |
| Comparative Example 1 | C | Failure | Present |
| Comparative Example 2 | C | Failure | Present |
| Comparative Example 3 | E | Excellent | Present |
| Comparative Example 4 | E | Excellent | None |
| Comparative Example 5 | A | Failure | Present |
| Comparative Example 6 | A | Failure | None |
| Comparative Example 7 | A | Failure | None |
| Comparative Example 8 | A | Failure | None |

Examples 2 to 10

The procedure of Example 1 was repeated except that a maximum thickness $A_{max}$ and a minimum thickness $A_{min}$ of a first circumferential wall and an average thickness B of a second circumferential wall were changed as shown in Table 1, to manufacture honeycomb structures of Examples 2 to 10. The average thickness B of the second circumferential wall was adjusted in accordance with an amount of a circumference coating material to be coated. The procedure of Example 1 was repeated to evaluate "thermal shock resistance" and "shape accuracy" as to the honeycomb structures of Examples 2 to 10. Table 2 shows the result.

Comparative Examples 1 to 4

The procedure of Example 1 was repeated except that a maximum thickness $A_{max}$ and a minimum thickness $A_{min}$ of a first circumferential wall and an average thickness B of a second circumferential wall were changed as shown in Table 1, to manufacture honeycomb structures of Comparative Examples 1 to 4. The average thickness B of the second circumferential wall was adjusted in accordance with an amount of a circumference coating material to be coated. The procedure of Example 1 was repeated to evaluate "thermal shock resistance" and "shape accuracy" as to the honeycomb structures of Comparative Examples 1 to 4. Table 2 shows the result.

Comparative Examples 5 to 8

The procedure of Example 1 was repeated except that a maximum thickness $A_{max}$ and a minimum thickness $A_{min}$ of a first circumferential wall indicated values shown in Table 1, to manufacture honeycomb structures of Comparative Examples 5 to 8. Each of the honeycomb structures of Comparative Examples 5 to 8 was a monolithic honeycomb structure which did not include a second circumferential wall prepared by coating a circumference coating material. The procedure of Example 1 was repeated to evaluate "thermal shock resistance" and "shape accuracy" as to the honeycomb structures of Comparative Examples 5 to 8. Table 2 shows the result.

(Result)

All of the honeycomb structures of Examples 1 to 10 satisfied a passing criterion in the evaluation of the thermal shock resistance. Furthermore, as to all of the honeycomb structures of Examples 1 to 10, a suitable result of "excellent" or "good" was obtainable also in the evaluation of the shape accuracy.

The honeycomb structures of Comparative Examples 1 and 2 did not have the first circumferential wall, and hence, the result was "failure" in the evaluation of the shape accuracy.

As to the honeycomb structures of Comparative Examples 3 and 4, the result was the evaluation "E" in the evaluation of the thermal shock resistance. In the honeycomb structures of Comparative Examples 3 and 4, the maximum thickness $A_{max}$ of the first circumferential wall was in excess of 0.3 mm, and hence, it can be considered that the first circumferential wall thickens and micro cracks having a buffering action against thermal expansion are not sufficiently generated.

The honeycomb structures of Comparative Examples 5 to 8 satisfied the passing criterion in the evaluation of the thermal shock resistance, but the honeycomb structures did not include the second circumferential wall, and hence, the result was "failure" in the evaluation of the shape accuracy.

A honeycomb structure of the present invention is utilizable as a catalyst carrier onto which there is loaded a catalyst to purify an exhaust gas emitted from a gasoline engine, a diesel engine or the like, or a filter to purify the exhaust gas.

DESCRIPTION OF REFERENCE NUMERALS

1 and 21: partition wall, 2 and 22: cell, 3 and 23: first circumferential wall, 4 and 24: second circumferential wall, 5 and 25: honeycomb structure body, 11 and 31: inflow end face, 12: outflow end face, 26: unevenness, 100 and 200: honeycomb structure, P: wave length, and T: value of a difference between a maximum thickness and a minimum thickness of the first circumferential wall.

What is claimed is:

1. A honeycomb structure comprising:
   a honeycomb structure body having porous partition walls which define a plurality of cells extending from an inflow end face to an outflow end face to form through channels for a fluid, and a first circumferential wall which is disposed in at least a part of a circumference of the porous partition walls, and
   a second circumferential wall disposed to surround an outer side of the honeycomb structure body,
   wherein the honeycomb structure body does not have an interface between at least the part of the circumference of the porous partition walls and the first circumferential wall, and in a face perpendicular to an extending direction of the plurality of cells, a minimum thickness of the first circumferential wall is 0 mm, and a maximum thickness of the first circumferential wall is from 0.1 to 0.3 mm, wherein the surface of the first circumferential wall is an uneven face having unevenness, and in the face perpendicular to the extending direction of the plurality of cells, a peripheral length of the surface of the first circumferential wall is a length from 1.001 to 1.003 times as much as a peripheral length of a circle equivalent to an area of a region surrounded by the first circumferential wall, and wherein the uneven face of the first circumferential wall has a corrugated wave shape, and a wave length of the corrugated wave shape is from 5.1 to 8.5 mm.

2. The honeycomb structure according to claim 1, wherein in the face perpendicular to the extending direction of the plurality of cells, an average thickness of the second circumferential wall is from 0.8 to 1.4 mm.

3. The honeycomb structure according to claim 1, wherein in the face perpendicular to the extending direction of the plurality of cells, a total of the maximum thickness of the first circumferential wall and an average thickness of the second circumferential wall is from 1.0 to 1.7 mm.

4. The honeycomb structure according to claim 1, wherein in the face perpendicular to the extending direction of the plurality of cells, a ratio of the maximum thickness of the first circumferential wall to an average thickness of the second circumferential wall is from 0.1 to 0.3.

* * * * *